(No Model.)

B. F. JONES.
HAME FASTENER.

No. 295,496. Patented Mar. 18, 1884.

WITNESSES:
John M. Deemer
C. Sedgwick

INVENTOR:
B. F. Jones
BY Munn & Co.
ATTORNEYS.

UNITED STATES PATENT OFFICE.

BENJAMIN F. JONES, OF BEAUREGARD, MISSISSIPPI.

HAME-FASTENER.

SPECIFICATION forming part of Letters Patent No. 295,496, dated March 18, 1884.

Application filed August 15, 1883. (No model.)

*To all whom it may concern:*

Be it known that I, BENJAMIN F. JONES, of Beauregard, in the county of Copiah and State of Mississippi, have invented a new and Improved Hame-Fastener, of which the following is a full, clear, and exact description.

The object of the invention is to construct and combine the parts which make up a hame-fastener, as hereinafter described, and pointed out in the claim.

Reference is to be had to the accompanying drawings, forming part of this specification, in which similar letters of reference indicate corresponding parts in all the figures.

Figure 1:
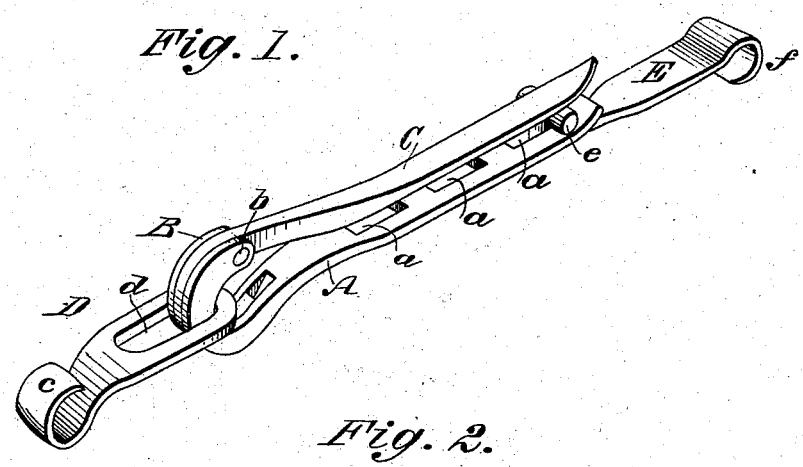
Figure 2:
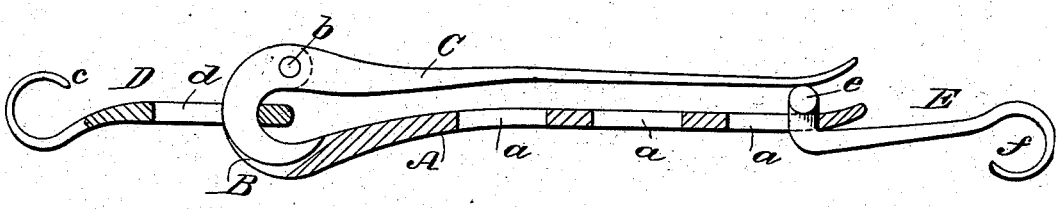
Figure 3:
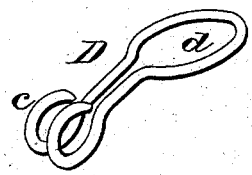
Figure 4:
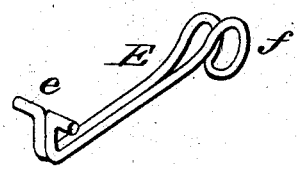

Figure 1 is a perspective view of my new and improved hame-fastener. Fig. 2 is a sectional side elevation of the same; and Figs. 3 and 4 are perspective views, showing different forms of the hooked bar.

A represents the main bar of the fastener. This has three mortises, $a\ a\ a$, made through it, instead of one, as in my above-mentioned patent. One end of the bar A terminates in a bifurcated hook, B, between the members of which the hook-lever C is pivoted by means of the rivet or bolt $b$.

D represents a bar formed with the hook $c$ and mortise $d$. The hook $c$ is intended to pass through and to be secured to the link at the bottom of the ordinary iron or iron-bound hame; but the hook $c$ may be lengthened and twisted or turned at a right angle with the mortise $d$, and made so as to pass through the holes in an ordinary wooden or plow hame. The bar D may be made of round iron doubled and bent to form the hook and mortise, as shown in Fig. 3, and the parts of these round iron bars might be twisted at the points where they come together, and so as to leave the mortise or loop $d$ for the admission of the lever C and hook B, as shown in Figs. 1 and 2.

E represents a bar formed with the toggle $e$ at one end and the hook $f$ at the other end. The hook $f$ is intended to pass through and to be secured to the link at the bottom of an iron or iron-bound hame; or, by lengthening this hook, it may be made to pass through the bottom hole of an ordinary wooden hame, the same as may be done with the hook D. The toggle $e$ is used for connecting the bar E to the bar A, and for bringing the hames nearer together at the bottom by passing it through one or other of the mortises $a$ in the bar A that may be necessary. The hooked bar E may also be made of folded and bent round iron, as shown in Fig. 4, and it may also be twisted where the folded parts of the bar come together, the same as in the case of the hooked bar D; and in making the bar E of round iron the toggle $e$ may be turned at right angles with the hook $f$, and the same may be done in making the bar D of round iron, which will throw the lever C to the front instead of above or below the bar A, as shown in Figs. 1 and 2.

To use my fastener, the hook $c$ of the bar D is secured to the link at the bottom of one of the hames, and the hook $f$ of bar E is secured to the link at the bottom of the other hame. The toggle $e$ of the bar E is then placed in any one of the openings or mortises $a$ in the bar A that may be necessary. Then the lever C is passed through the mortise or loop $d$ of the bar D, and is then brought down upon or against the bar A, to the position shown in Figs. 1 and 2, which draws the hame together, and brings the mortise or loop $d$ into hook B of bar A and secures the hames.

I am aware that it is not new in harness-buckles to connect the end parts so as to bring the hooks nearer to or more remote from each other by a rear shouldered lever adapted to lock in one of a series of holes in one of the shanks, or, in a hame-fastener, to combine with the end hooks a piece having a hook at each end and one or more intermediate hooks, so as to draw the hames more or less close together, according to the size of the horse's neck; but What I do claim as new and of my invention is—

In a hame-fastener, the combination of the bar A, having slots $a$ and bifurcated end hook, B, the lever C, having a rear hook pivoted between the bifurcations of hook B, the bar D, having hook $c$ and mortise $d$, and the bar E, having toggle $e$ and hook $f$, substantially as shown and described.

BENJAMIN F. JONES.

Witnesses:
ROBT. LEE JONES,
EDMUND H. THOMPSON.